United States Patent
Schroeder

(10) Patent No.: US 7,281,687 B2
(45) Date of Patent: Oct. 16, 2007

(54) IN-FLIGHT REFUELING SYSTEM AND METHOD FOR FACILITATING EMERGENCY SEPARATION OF IN-FLIGHT REFUELING SYSTEM COMPONENTS

(75) Inventor: Steven B. Schroeder, Derby, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/890,664

(22) Filed: Jul. 14, 2004

(65) Prior Publication Data

US 2006/0011782 A1   Jan. 19, 2006

(51) Int. Cl.
    *B64D 37/02* (2006.01)
(52) U.S. Cl. .................................. 244/135 A
(58) Field of Classification Search ............ 244/135 A, 244/135 B, 135 C, 135 R, 136; 141/207, 141/94, 209
    See application file for complete search history.

(56) References Cited

U.S. PATENT DOCUMENTS

| | | | | |
|---|---|---|---|---|
| 2,642,297 A | * | 6/1953 | Hanna ......................... 285/304 |
| 2,793,828 A | * | 5/1957 | Rohtert ..................... 244/135 A |
| 2,973,171 A | | 2/1961 | Ward et al. |
| 3,062,247 A | * | 11/1962 | Botkin ........................ 141/209 |
| 3,687,491 A | * | 8/1972 | Marshall ..................... 285/242 |
| 3,915,206 A | * | 10/1975 | Fowler et al. ................. 141/59 |
| 4,090,539 A | * | 5/1978 | Krupp ......................... 141/198 |
| 4,167,958 A | * | 9/1979 | Voelz .......................... 141/95 |
| 4,288,845 A | * | 9/1981 | Finsness et al. ............. 362/472 |
| 4,361,165 A | * | 11/1982 | Flory .......................... 137/69 |
| 4,438,793 A | | 3/1984 | Brown |
| 4,615,547 A | * | 10/1986 | Sutcliffe et al. ......... 285/121.6 |
| 4,617,975 A | * | 10/1986 | Rabushka et al. ...... 141/311 R |
| 4,625,746 A | * | 12/1986 | Calvin et al. ............ 137/68.15 |
| 4,667,883 A | * | 5/1987 | Fink, Jr. ...................... 239/569 |
| 4,682,795 A | * | 7/1987 | Rabushka et al. ............. 285/1 |
| 4,687,033 A | * | 8/1987 | Furrow et al. ................ 141/59 |
| 4,691,941 A | * | 9/1987 | Rabushka et al. ............. 285/1 |
| 4,827,977 A | * | 5/1989 | Fink, Jr. ................. 137/614.04 |
| 4,828,183 A | * | 5/1989 | Fink, Jr. ...................... 239/569 |
| 4,899,792 A | * | 2/1990 | Podgers ...................... 141/382 |
| 5,131,438 A | * | 7/1992 | Loucks .......................... 141/1 |
| 5,326,052 A | * | 7/1994 | Krispin et al. .......... 244/135 A |
| 5,506,570 A | * | 4/1996 | Scott et al. .................. 340/603 |
| 5,564,471 A | * | 10/1996 | Wilder et al. .......... 137/614.04 |
| 5,660,206 A | * | 8/1997 | Neal et al. ................... 137/592 |
| 5,720,327 A | * | 2/1998 | Foster, Jr. .................... 141/207 |
| 5,758,682 A | | 6/1998 | Cain |
| 5,826,610 A | | 10/1998 | Bodhaine |

(Continued)

*Primary Examiner*—Teri Pham Luu
*Assistant Examiner*—Stehen A Holzen
(74) *Attorney, Agent, or Firm*—Alston & Bird LLP

(57) ABSTRACT

An in-flight refueling system and method are provided for facilitating the emergency separation of the components of a probe and drogue in-flight refueling. The in-flight refueling system and method provides a fuse device capable of being installed between, for instance, an elongate hose configured to trail from a tanker aircraft, and a drogue connected to, and in fluid communication with, the elongate hose. The fuse device may be configured to separate in response to a separating force such that the drogue may separate from the elongate hose prior to the exertion of a damaging force, a non-certified force, or an unknown aerodynamic force on the elongate hose, on a probe carried by a second receiver aircraft, or on the tanker aircraft.

12 Claims, 5 Drawing Sheets

U.S. PATENT DOCUMENTS

| | | | |
|---|---|---|---|
| 5,906,336 A * | 5/1999 | Eckstein | 244/135 A |
| 5,921,266 A * | 7/1999 | Meyer | 137/68.14 |
| 6,021,823 A * | 2/2000 | Hale | 141/231 |
| 6,334,474 B1 * | 1/2002 | Rababy et al. | 141/207 |
| 6,464,173 B1 * | 10/2002 | Bandak | 244/135 A |
| 6,588,465 B1 * | 7/2003 | Kirkland et al. | 141/279 |
| 6,601,800 B2 * | 8/2003 | Ollar | 244/135 A |
| 6,604,711 B1 * | 8/2003 | Stevens et al. | 244/135 A |
| 6,651,933 B1 * | 11/2003 | von Thal et al. | 244/136 |
| 6,669,145 B1 * | 12/2003 | Green | 244/135 A |
| 6,786,455 B1 * | 9/2004 | Bartov | 244/135 A |
| 6,837,462 B2 * | 1/2005 | von Thal et al. | 244/135 A |
| 2003/0136874 A1 * | 7/2003 | Gjerdrum | 244/10 |
| 2003/0205643 A1 * | 11/2003 | von Thal et al. | 244/135 A |
| 2004/0069904 A1 * | 4/2004 | Thal et al. | 244/135 A |
| 2005/0017130 A1 * | 1/2005 | Shelly et al. | 244/135 A |

* cited by examiner

IN-FLIGHT REFUELING SYSTEM AND METHOD FOR FACILITATING EMERGENCY SEPARATION OF IN-FLIGHT REFUELING SYSTEM COMPONENTS

FIELD OF THE INVENTION

The present invention relates generally to in-flight refueling of a manned or unmanned aircraft using a probe and drogue in-flight refueling system, and specifically, providing a mechanical fuse device configured to safely and predictably separate two components of an in-flight refueling system. More particularly the mechanical fuse device and method of the present invention provide a mechanical fuse having a known yield point for use in an in-flight refueling system such that should the in-flight refueling system be subjected to tension or shear forces in excess of the yield point of the mechanical fuse device the mechanical fuse may separate in a controlled manner so as to minimize damage to other components of the in-flight refueling system.

BACKGROUND OF THE INVENTION

In-flight refueling (or air-to-air refueling) is an important method for extending the range of both manned and unmanned aircraft traveling long distances over areas having no feasible landing or refueling points. Although in-flight refueling is a relatively common operation, especially for military aircraft, the passage of large amounts of fuel between a first aircraft (serving, for example, as a tanker aircraft) and second aircraft during an in-flight refueling operation may create a potentially dangerous situation, especially if components of the in-flight refueling system separate and/or fail in an uncontrolled manner.

One conventional system for in-flight refueling is the probe and drogue in-flight refueling system wherein the tanker aircraft may extend a flexible hose having an end attached to a drogue such that the second aircraft having a refueling probe, may engage the drogue while in flight in order to initiate the transfer of fuel. An operator of the second aircraft is responsible for maneuvering the second aircraft such that the refueling probe extending therefrom may enter and engage the drogue. According to some conventional probe and drogue in-flight refueling systems, the engagement of the refueling probe with the drogue is accomplished as the second aircraft accelerates with respect to the trailing drogue. The drogue may include, for instance, a catch mechanism for securing the refueling probe within the drogue so that the refueling probe may be securely fastened within the drogue during the transfer of fuel.

At the conclusion of the in-flight refueling operation, the operator of the second aircraft may control the second aircraft such that the second aircraft may decelerate with respect to the trailing drogue such that a separating force is exerted on the refueling probe such that the refueling probe may be disengaged from the drogue and/or the catch mechanism within the drogue. The operator of the second aircraft is responsible for decelerating the second aircraft in a controlled manner so as to safely disengage the refueling probe from the drogue without introducing excessive tension or shear forces to the trailing hose or components of the in-flight refueling system that may be disposed within a fuselage of the tanker aircraft or in a pod hanging, for instance, on a wing hardpoint of the tanker aircraft. In some cases, however, the catch mechanism within the trailing drogue may malfunction such that the refueling probe may not be disengaged from the trailing drogue without subjecting the hose and/or other in-flight refueling system components to an excessive tension or shear force.

In such cases, conventional probe and drogue in-flight refueling systems may provide a guillotine system disposed, for instance, in the fuselage of the tanker aircraft, for jettisoning the hose from the tanker aircraft. More particularly, a guillotine blade may be configured to be capable of cutting the hose at a point inside or near the fuselage of the tanker aircraft such that the hose may fall away from the tanker aircraft. In addition, the guillotine may block the fuel conduit defined within the remaining length of hose and may further, in cooperation with fuel shut-off valves disposed within the tanker aircraft, prevent additional fuel from flowing from the tanker aircraft. If the guillotine system is used, however, the jettisoned portion of the hose may still hang from the refueling probe of the second aircraft such that a long section of loose hose may be left trailing from the refueling probe. Such a situation may be extremely dangerous for the operator of the second aircraft, as the remaining section of hose may oscillate uncontrollably with respect to the second aircraft and may strike and shatter a windscreen of the second aircraft or strike and damage a control surface of the second aircraft. Additionally, if the second aircraft is a jet powered aircraft, the remaining section of hose may be drawn into a jet intake of the second aircraft and damage one or more of the engines of the second aircraft.

If the catch mechanism of the drogue malfunctions as described above, the operators of the first and second aircraft, may also confer and decide to attempt to land the first and second aircraft in unison so as to prevent the need for jettisoning the hose. This option, however, may also be extremely dangerous, given the precision required to maintain the second aircraft in a position relative to the tanker aircraft so as to safely land the aircraft in unison. In addition, this option may not be available if, for instance, the in-flight refueling operation is underway far away from an available airfield. It is this situation that presents the need to conduct in-flight refueling operations in the first place. In addition, such a landing may be impossible in cases where the first and second aircraft may have significantly different stall characteristics.

Thus, it would be advantageous to provide an alternative method for disengaging the hose and/or drogue from a refueling probe of a second aircraft should the refueling probe of the second aircraft be unable to be safely disengaged from the drogue during an in-flight refueling operation. In addition, it would be advantageous to provide a separating mechanism that may separate the drogue from the hose carried by the tanker aircraft in a controlled and predictable manner so as to avoid the dangerous situations described in more detail above. It would be especially advantageous to provide a separating mechanism disposed between an end of the hose and the drogue of a probe and drogue in-flight refueling system such that upon the exertion of a separating force, the hose may separate from the drogue such that a severed portion of hose may be less likely to hang from the refueling probe (and the drogue attached thereto) of the second aircraft. Thus, the second aircraft may safely extract itself from a refueling connection with the tanker aircraft leaving only the drogue attached to the refueling probe.

Therefore, there exists a need for a mechanical fuse device and method for facilitating controlled separation of in-flight refueling system components that may be installed in a probe and drogue in-flight refueling system. More particularly, there exists a need for a mechanical fuse device that may be disposed between selected components of a probe and drogue in-flight refueling system such that the mechanical fuse device may be configured to be capable of separating in a controlled and predictable manner such that a second aircraft may safely disengage from the probe and drogue in-flight refueling system carried by a tanker aircraft even in cases where, for instance, an in-flight refueling probe carried by the second aircraft may not be capable of disengaging from a drogue trailing from the tanker aircraft.

SUMMARY OF THE INVENTION

The embodiments of the present invention satisfy the needs listed above and provide other advantages as described below. The in-flight refueling system and method of the present invention provide for the controlled emergency separation of probe and drogue in-flight refueling system components in response to a separating force. More particularly, the in-flight refueling system according to one embodiment of the present invention comprises: a tanker aircraft; an elongate hose having a first end carried by the tanker aircraft and a drogue operably engaged with and in fluid communication with an opposing second end of the elongate hose; and a fuse device operably engaged between a first end of the elongate hose and the drogue so as to allow fluid communication therebetween. The fuse device may be configured to disengage the drogue from the elongate hose in response to a separating force experienced thereby. The fuse device may also be further configured to be separable into a first segment operably engaged with a first portion of the elongate hose and a second segment operably engaged with the drogue in response to a separating force experienced by the fuse device. Thus, the in-flight refueling system may allow the drogue to be separable from the first portion of the elongate hose in response to the separating force. Furthermore, in some embodiments, the fuse device may be positioned between the second end of the hose and the drogue such that the fuse device may be capable of separating into a first segment operably engaged with the second end of the elongate hose and a second segment operably engaged with the drogue in response to a separating force experienced thereby, such that the drogue may be separable from the second end of the elongate hose in response to the separating force.

The fuse device provided as part of the in-flight refueling system may be further configured such that the separating force is less than a breakage force required to damage the elongate hose. Furthermore, according to other embodiments, fuse device provided as part of the in-flight refueling system of the present invention may further comprise a first threaded portion configured to be capable of operably engaging a first threaded surface disposed on the second end of the elongate hose; and a second threaded portion configured to be capable of operably engaging a second threaded surface disposed on the drogue such that the elongate hose and drogue may be connected and in fluid communication via the fuse device.

The embodiments of the present invention also provide a method for facilitating the emergency separation of a drogue from an elongate hose wherein the drogue and elongate hose are operably engaged and in fluid communication via a fuse device as part of an in-flight refueling system. The method, according to one embodiment of the present invention, may comprise the steps of: exerting a separating force on the drogue; and disengaging the drogue from elongate hose at the fuse device in response to a separating force exerted on the elongate hose and the drogue, such that the first portion of the elongate hose is separable from the drogue in response to the separating force. According to some method embodiments, the disengaging step may further comprise separating the fuse device into a first segment operably engaged with the elongate hose and a second segment operably engaged with the drogue in response to the separating force experienced thereby. According to other advantageous embodiments, the method of the present invention may further comprise the step of blocking a flow of fuel through the elongate hose so as to prevent the flow of fuel from exiting the elongate hose via the first segment.

Thus the various embodiments of the in-flight refueling system and method of the present invention provide many advantages that may include, but are not limited to: providing a disengageable and/or separable fluid connection between an elongate hose and a drogue as part of a probe and drogue in-flight refueling system such that the drogue and hose may separate at a predictable point in response to a separating force exerted between a tanker aircraft carrying the elongate hose and drogue and a second aircraft carrying a refueling probe configured to engage the drogue; providing a fuse device that may be easily connected to both the elongate hose and the drogue such that a replacement fuse device may be installed in the probe and drogue in-flight refueling system following an emergency separation of the in-flight refueling system components; and minimizing the chance that the elongate hose may be severed by the separating force so as to minimize the likelihood that a severed portion of the elongate hose may be attached to a refueling probe carried by a second aircraft.

These advantages and others that will be evident to those skilled in the art are provided in the in-flight refueling system and method of the present invention.

BRIEF DESCRIPTION OF THE DRAWINGS

Figure 1:
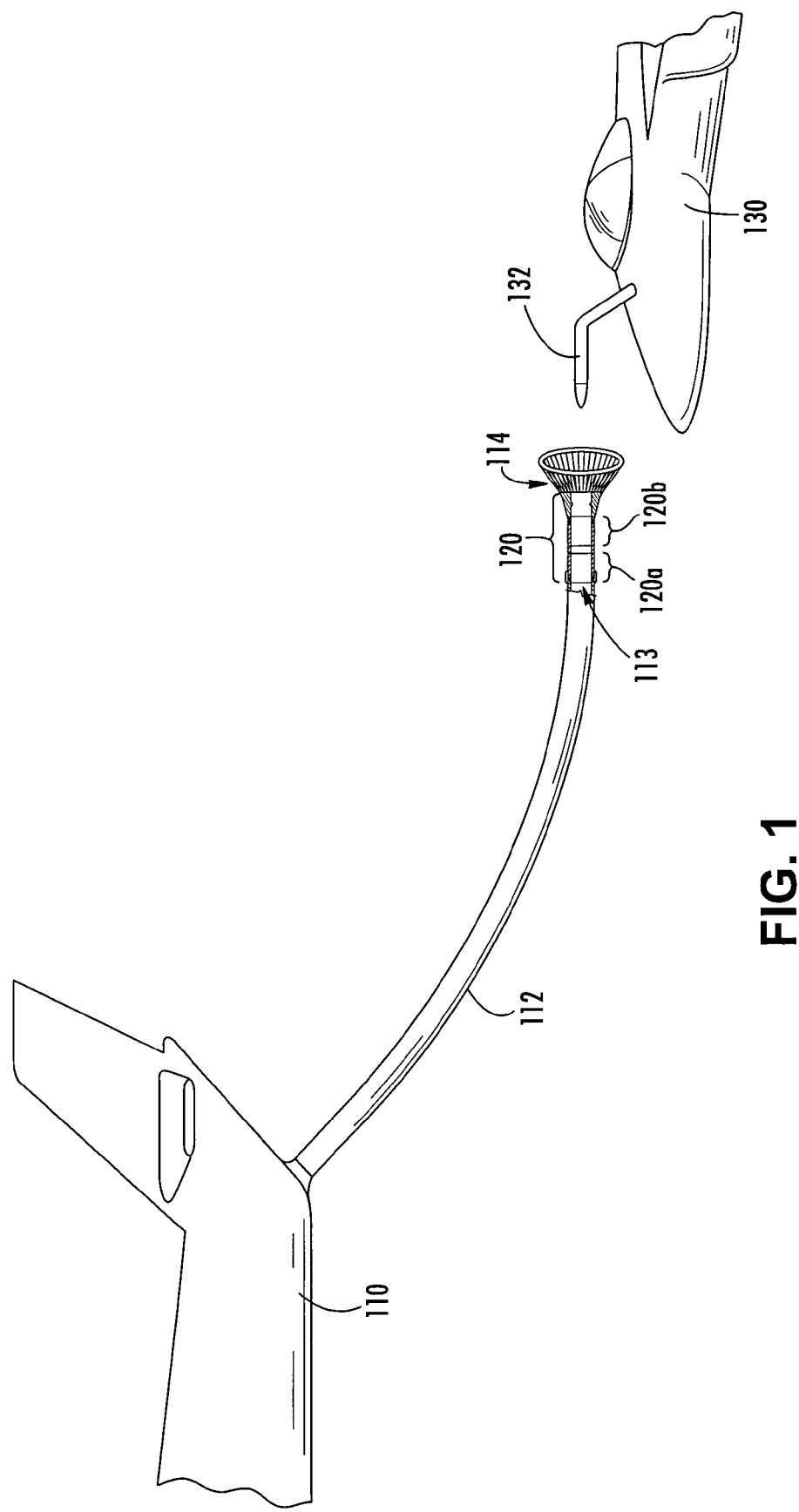
Figure 2:
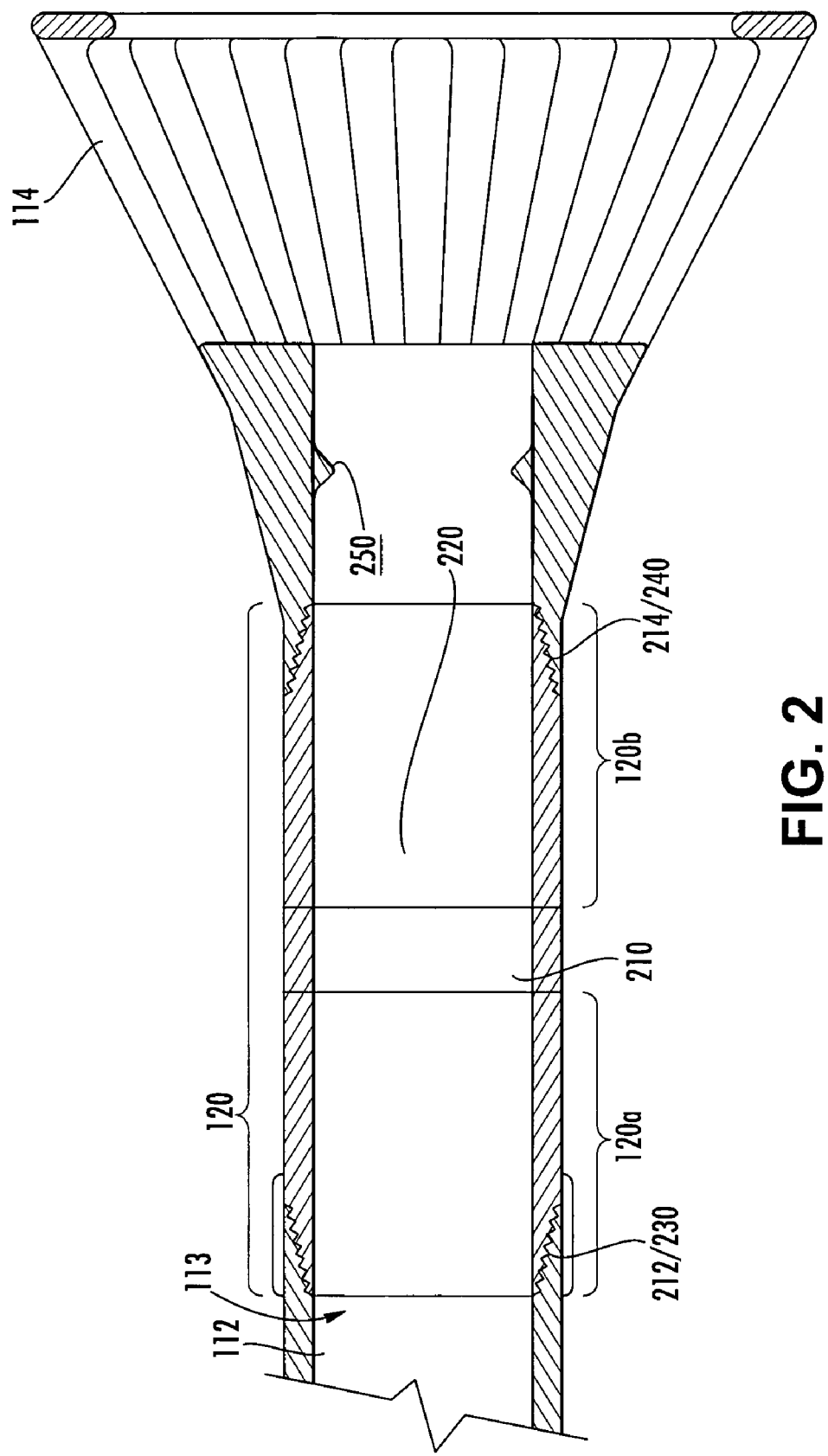
Figure 4:
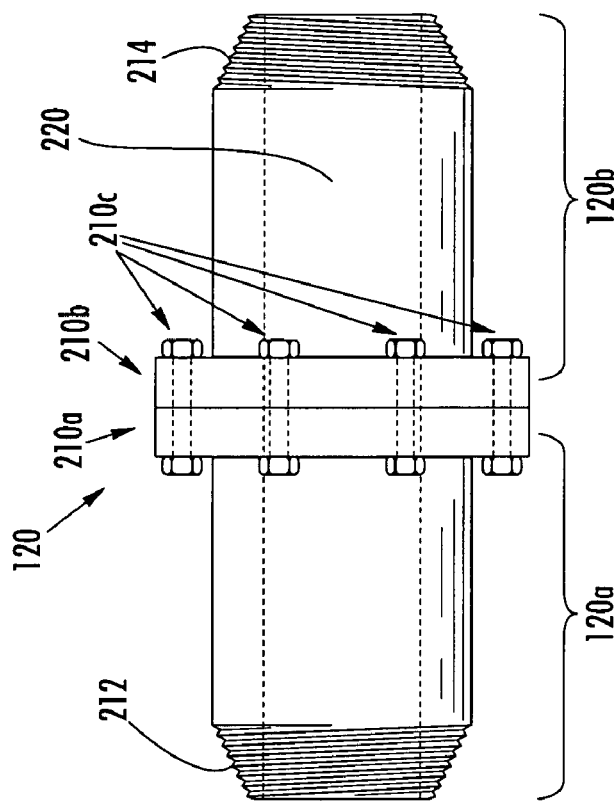
Figure 3:
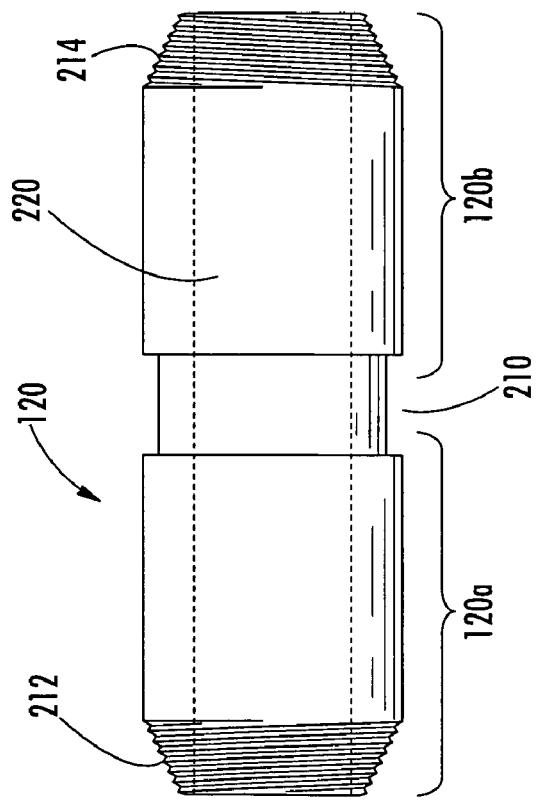
Figure 5:
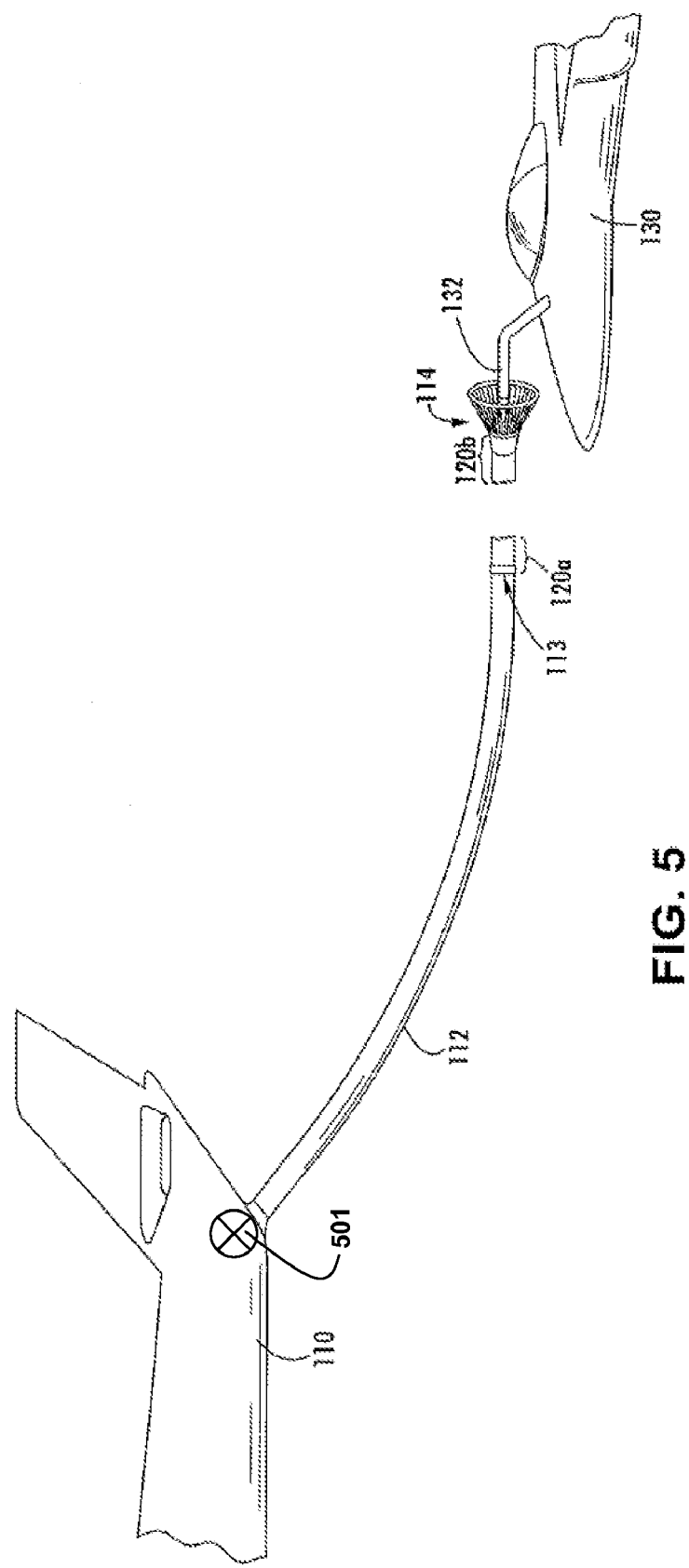
Figure 6:
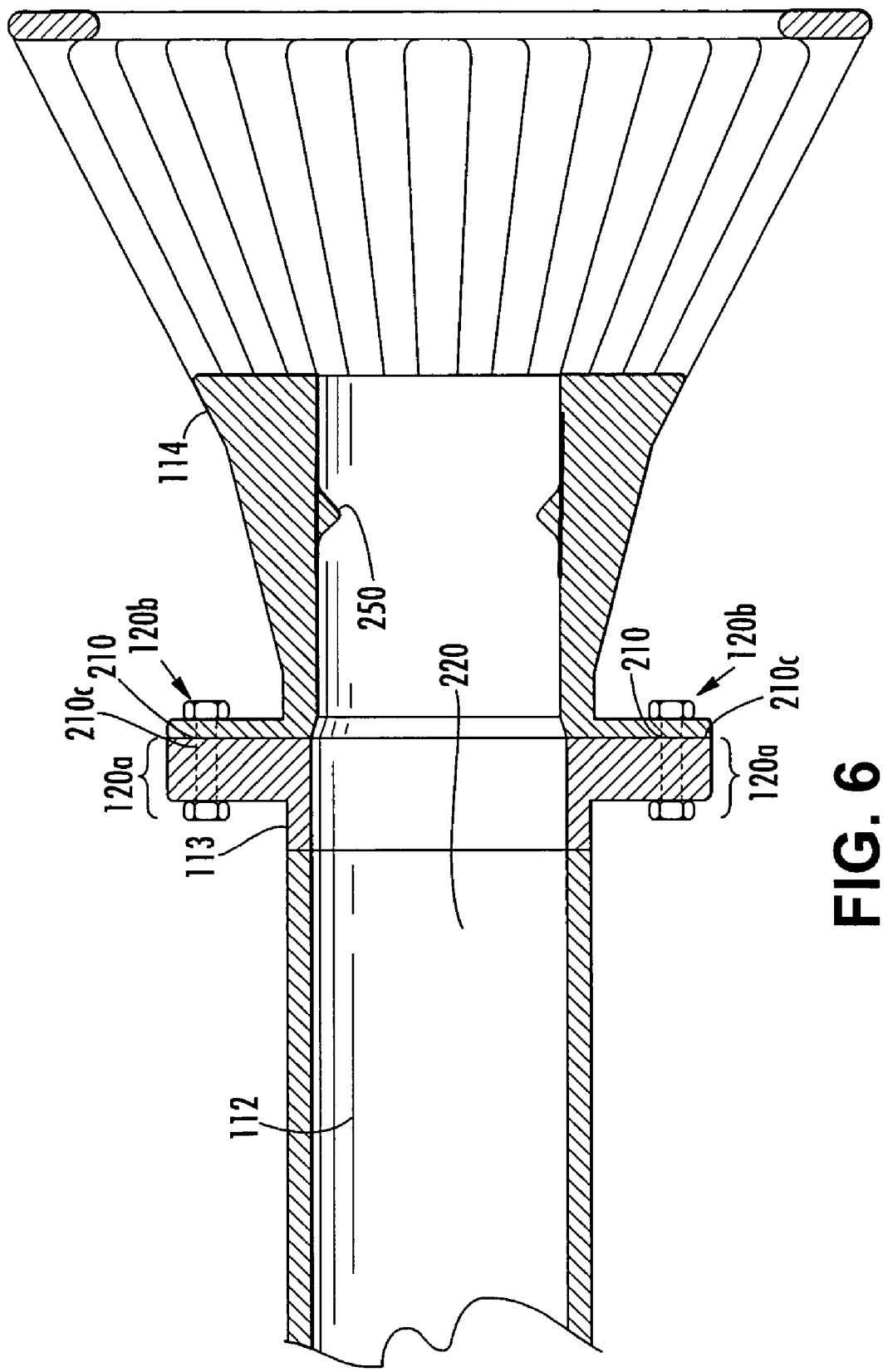

Having thus described the invention in general terms, reference will now be made to the accompanying drawings, which are not necessarily drawn to scale, and wherein:

FIG. 1 shows an elongate hose and attached drogue extending from a tanker aircraft according to one embodiment of the present invention and a second aircraft carrying a refueling probe approaching the tanker aircraft;

FIG. 2 shows a partial cross-section of a fuse device according to one embodiment of the present invention wherein the fuse device is disposed between an elongate hose and a drogue as part of a probe and drogue in-flight refueling system;

FIG. 3 shows a fuse device according to one embodiment of the present invention wherein the cross section of the fuse device is minimized at a channel defined in an outer surface of the fuse device;

FIG. 4 shows a fuse device according to one embodiment of the present invention wherein the first and second portions of the fuse device are connected via at least one shear bolt at a junction;

FIG. 5 shows an in-flight refueling system according to one embodiment of the present invention wherein the fuse device has been separated in response to a separating force so that the elongate hose is separated from the drogue; and FIG. 6 shows a partial cross-section of a connection between the elongate hose and the drogue wherein the fuse device comprises one or more shear bolts configured to directly connect the elongate hose to the drogue.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While the in-flight refueling system and method embodiments of the present invention are described below in the context of a fuse device 120 disposed between an elongate hose 112 and a drogue 114, it should be understood that the embodiments of the present invention may also be utilized to achieve the controlled and predictable separation of a variety of in-flight refueling system components that may be subjected to a separation force during the course of an in-flight refueling operation, including, but not limited to, connections between a tanker aircraft 110 and an end of the elongate hose 112, connections between adjacent and separable portions of elongate hose 112, connections between a fuel reservoir and a probe and drogue in-flight refueling system carried by a tanker aircraft 110 and other fluid connections between in-flight refueling system components that may require safely controlled and predictable separation when subjected to a separating force. It should also be understood that the embodiments of the present invention may also be utilized in in-flight refueling systems other than probe and drogue refueling systems, such as, for instance boom in-flight refueling systems and/or wing-mounted pod-based probe and drogue in-flight refueling systems.

FIG. 1 shows a schematic view of a probe and drogue in-flight refueling operation wherein a tanker aircraft 110 is shown carrying and extending an elongate hose 112 having a first end (not shown) carried by (and in fluid communication with a fuel reservoir onboard) the tanker aircraft 110 and a drogue 114 operably engaged with and in fluid communication with an opposing second end 113 of the elongate hose 112. The first end of the elongate hose 112 may be operably engaged with a hose take-up assembly (such as a roller drum) carried by the tanker aircraft 110, and the second end 113 of the elongate hose 112 and the drogue 114 operably engaged therewith way be configured to be taken up into a tunnel or/other aperture defined in a fuselage of the tanker aircraft 110 as the hose take-up assembly retracts the elongate hose 112. Also shown in FIG. 1 is a second aircraft 130 carrying a refueling probe 132 configured to enter and become operably engaged with the drogue 114 so as to enable fuel to pass from the tanker aircraft 110 through the elongate hose 112 to the second aircraft 130 as part of an in-flight refueling operation. An operator of the second aircraft (either, for instance, an on-board operator or a remote operator in the case of an unmanned aircraft (UAV)) is responsible for positioning the second aircraft 130 with respect to the drogue 114 such that the refueling probe 132 may enter and engage the drogue 114. Also shown is a fuse device 120, disposed between the second end 113 of the elongate hose 112 and the drogue 114 so as to allow fluid communication between the elongate hose 112 and the drogue 114. The fuse device 120, in some embodiments, may be disposed between the second end 113 of the elongate hose 112 and the drogue 114 in a low-profile arrangement (as shown generally in FIG. 2) such that the fuse device 120 may be taken up into the tunnel or other aperture defined in a fuselage of the tanker aircraft 110 as the hose take-up assembly retracts the elongate hose 112. Furthermore, the fuse device 120 is configured to disengage the drogue from the elongate hose in response to a separating force experienced thereby, such that the elongate hose is separable from the drogue in response to the separating force. More particularly, in some embodiments, the fuse device 120 may be separable into a first segment 120a operably engaged with the second end 113 of the elongate hose 112 and a second segment 120b operably engaged with the drogue 114 in response to a separating force experienced by the fuse device 120. Thus, according to the embodiments of the present invention, the drogue 114 may be separable from the second end 113 of the elongate hose 112 in response to the separating force (as shown in FIG. 5). Although the fuse device 120 is shown to be between the second end 113 of the elongate hose 112 and the drogue 114, the fuse device 120 may be positioned elsewhere along the hose such that the fuse device 120 is disposed between two portions of the elongate hose 112, thereby allowing the two portions of the elongate hose 112 to be separable in a similar manner when subjected to the separating force.

FIG. 2 shows a more detailed view of the fuse device 120 and its disposition between the elongate hose 112 and the drogue 114. The fuse device 120 may define, for instance, a fuel conduit 220 therein such that fuel may pass from the second end 113 of the elongate hose 112 through the first and second segments 120a, 120b, and through the drogue 114 to a refueling probe 132 (see FIG. 1) carried by a second aircraft 130. An interior of the drogue 114 may further comprise, for instance, a catch mechanism 250 configured to be capable of securing the refueling probe 132 carried by the second aircraft 130 after the operator of the second aircraft 130 has positioned the second aircraft 130 such that the refueling probe 132 enters the drogue 114. Furthermore, one skilled in the art will appreciate that the operator of the second aircraft 130 may also be responsible for disengaging the refueling probe 132 from the drogue 114 at the conclusion of the in-flight refueling operation by, for instance, decelerating with respect to the tanker aircraft 110 so as to exert a tension force on the drogue 114 and the catch mechanism 250 that holds the refueling probe 132 within the drogue 114. In some cases, however, the catch mechanism 250 may malfunction such that the operator of the second aircraft 130 may be unable to disengage the refueling probe 132 from the drogue 114 without exerting an excessive tension force on the drogue 114 and attached elongate hose 112 carried by the tanker aircraft 110. Such tension forces may, in some cases, be transferred along the elongate hose 112 and into a fuselage of the tanker aircraft 110 to, for instance, a rotating drum hose take-up assembly. Such tension forces may also, if allowed to continue, tear or break the elongate hose 112 at an unpredictable point along the length of the elongate hose 112.

Thus, according to embodiments of the present invention, as shown in FIG. 2, the fuse device 120 may comprise a separable portion 210 disposed between the first and second segments 120a, 120b and configured to be capable of failing (by, for instance, an elastic failure or after a substantially plastic deformation) in response to a predetermined tension force such that the fuse device 120 may separate into a first segment 120a that may remain attached to the second end 113 of the elongate hose 112 and a second segment 120b that may remain attached to the drogue 114 in response to a separating force (such as, for example, a predetermined tension force) experienced by the fuse device 120. According to some embodiments, the separating force may be predetermined such that the separating force may be less than a breakage force required to damage the elongate hose 112.

The fuse device 120 may be connected to the elongate hose 112 and, in the illustrated embodiment, to the drogue 114 in any manner known to those skilled in the art. As shown in FIG. 2, however, some embodiments of the in-flight refueling system of the present invention may comprise a fuse device 120 including a first threaded portion 212 configured to be capable of operably engaging a first threaded surface 230 disposed on the second end 113 of the elongate hose 112 and a second threaded portion 214 configured to be capable of operably engaging a second threaded surface 240 disposed on the drogue 114. According to other embodiments, the fuse device may be configured so as to be capable of operably engaging the second end 113 of the elongate hose 112 and the drogue 114 by a variety of other connection mechanisms and techniques that may include, but are not limited to, bolts, rivets, adhesives, clamps, frictional press-fit components, and/or other mechanisms that may be suitable for connecting the fuse device 120 with the second end 113 of the elongate hose 112 as well as with the drogue 114 so as to be disposed between the elongate hose 112 and the drogue 114 and to allow fluid communication therebetween. In other instances, the fuse device 120 may be operably engaged with the second end 113 of the elongate hose 112 and the drogue 114 by a first connection mechanism as described above and also operably engaged therewith via a redundant safety mechanism (such as a safety wire connection) such that the fuse device 120 is connected to the elongate hose 112 and, in the illustrated embodiment, to the drogue 114 in a manner that is sufficiently secure such that the separating force required to cause the separable portion 210 to fail is less than that required to cause the connections of the fuse device 120 to the elongate hose 112 and drogue 114 to fail. In addition, regardless of the type of connection, the fuse device 120 is advantageously connected to the elongate hose 112 and, in the illustrated embodiment, to the drogue 114 in a manner that is sufficiently secure such that the separating force required to cause the separable portion 210 to fail is less than that required to cause the connections of the fuse device 120 to the elongate hose 112 and drogue 114 to fail, thereby ensuring that the separable portion 210 may fail while the opposed first and second segments 120a, 120b of the fuse device 120 remain coupled to the elongate hose 112 and the drogue 114.

Thus, in advantageous embodiments of the present invention, should the fuse device 120 be separated into the first segment 120a and the second segment 120b by, for instance, a separating force exerted during an in-flight refueling operation, both the tanker aircraft 110 and the second aircraft 130 may land safely with the elongate hose 112 and drogue 114 still attached respectively thereto (see FIG. 5, depicting the fuse device 120 after separation into first and second segments 120a, 120b). After the tanker aircraft 110 and the second aircraft 130 have safely landed, a technician may examine the first and second segments 120a, 120b, and subsequently remove them from the second end of the elongate hose 112 and the drogue 114, respectively. Thus, the technician may then simply insert a new fuse device 120 into a disposition between the second end 113 of the elongate hose 112 and the drogue 114 so that the probe and drogue in-flight refueling system may be returned to operational status in a relatively quick procedure when compared to repairs and/or inspections that must be completed in conventional probe and drogue in-flight refueling systems wherein the elongate hose 112 has been torn, sheared, and/or broken by a separating force. The technician may also, in some cases, examine the drogue 114 and its associated catch mechanism 250 in order to attempt to determine the cause for the catch mechanism's 250 failure to release the refueling probe 132 upon the exertion of a tension force exceeding the separation force that caused, for instance, the separation of the fuse device 120 into first and second segments 120a, 120b. Upon examination and/or a subsequent investigation of the catch mechanism 250, the technician may also repair and/or replace the drogue 114 and its associated catch mechanism 250 when replacing the fuse device 120.

As shown in FIGS. 1 and 2, and as described generally above, the fuse device 120 may comprise a separable portion 210 configured to be capable of failing in response to a separating force such that the fuse device 120 may separate into a first segment 120a that may remain attached to the second end 113 of the elongate hose 112 and a second segment 120b that may remain attached to the drogue 114 in response to the separating force experienced by the fuse device 120. The first and second segments may be composed of for instance, a metal, metallic alloy, polymer, composite material, or other material suitable for maintaining structural integrity as the adjacent separable portion 210 is allowed to controllably fail as described in more detail below. As shown in FIG. 3 the separable portion 210 may comprise a channel defined in the fuse device 120, wherein the channel is formed so as to purposely weaken the fuse device 120 such that the fuse device 120 will fail at a predictable point (the channel (or separable portion 210), for instance) in response to the applied separating force. According to some embodiments, the channel may be defined in an outer surface of the fuse device 250 (as shown in FIG. 3). In other embodiments, the channel may be defined in an inner surface of the fuse device 120. One skilled in the art will appreciate that the separable portion 210 of the fuse device 120 may comprise a pair of complementary channels defined in the inner and outer surfaces of the fuse device 120 so long as a fuel conduit may be maintained between the adjacent portions of the in-flight refueling system that may be connected by the fuse device 120. In addition, according to other embodiments, the separable portion 210 of the fuse device 120 may further comprise a material configured to fail elastically or after deforming in a substantially plastic mode prior to the failure of the first segment 120a, the second segment 120b, the elongate hose 112, or other components of the in-flight refueling system. The material used to produce the separable portion 210 may comprise, for instance, a metal, metallic alloy, polymer, composite material, or other material suitable for failing in a controlled and predictable manner in response to the separating force.

Furthermore, according to other embodiments of the present invention as shown generally in FIG. 4, the fuse device 120 may comprise a first segment 120a and a second segment 120b attached by the separable portion 210, wherein the separable portion 210 may comprise, for instance, a connector, such as one or more shear bolts 210c. In some instances, the first and second segments 120a, 120b may comprise first and second flanges 210a, 210b, respectively, that may be configured to receive and retain a connector, such as, for instance a shear bolt 210c. In such embodiments, the shear bolt 210c may be configured to fail elastically or after deforming in a substantially plastic mode prior to the failure of the first segment 120a, the second segment 120b, the elongate hose 112, or other components of the in-flight refueling system, such that the first segment 120a may be separable from the second segment 120b in response to a separating force having a magnitude sufficient to cause the failure of the shear bolt 210c. One skilled in the art will appreciate that other types of deformable and/or separable connectors may also be used to connect the first and second segments 120a, 120b of the fuse device 120 at a junction such as, for instance, the separable portion 210. Additionally, in such embodiments, a gasket or other sealing device may be disposed at substantially between the first and second segments 120a, 120b so as to seal the fluid conduit defined between the first and second segments 120a, 120b of the fuse device 120. Thus, in embodiments of the in-flight refueling system of the present invention comprising one or more shear bolts 210c configured to connect the first and second segments 120a, 120b of the fuse device 120 at a separable portion 210.

While the illustrated embodiment of FIG. 4 depicts the fuse device 120 having separable first and second segments 120a, 120b connected by a separable portion 210, the fuse device 120 may also comprise one or more shear bolts 210c configured to directly connect the second end 113 of the elongate hose 112 to the drogue 114 so as to allow fluid communication between the elongate hose 112 and the drogue 114 via a fuel conduit 220 defined therein. In such embodiments, as shown in FIG. 6, the shear bolt 210c may comprise a separable portion 210 disposed along a shaft of the shear bolt 210c such that the shear bolt 210c (or multiple shear bolts) may controllably and predictably fail in response to the separating force exerted thereon such that the drogue 114 may be released from the second end 113 of the elongate hose 112 leaving for instance, a first segment 120a of the shear bolt 210c operably engaged with the elongate hose 112 and a second segment 120b of the shear bolt 210c operably engaged with the drogue 114.

Also according to some embodiments of the present invention, the fuse device need not separate into a first and second segment 120a, 120b in order to effectively disengage the drogue 114 from the elongate hose 112. In some instances, the fuse device 120 may be operably engaged between the elongate hose 112 and the drogue 114 so as to allow fluid communication therebetween, and the fuse device 120 may be configured to disengage the drogue 114 from the elongate hose 112 in response to a separating force experienced thereby, such that the elongate hose 112 may be separable from the drogue 114 in response to the separating force. In some embodiments, after the separating force is exerted, the fuse device 120 may be left operably engaged with the second end 113 of the elongate hose 112. In other embodiments, the fuse device 120 may remain operably engaged with the drogue 114 after the separating force is applied. In either case, the fuse device 120 is configured to retain the elongate hose 112 in operable engagement (and fluid communication) with the drogue 114 in response to a tension force up to a level that is equal to or greater than the separating force required to cause the disengagement of the fuse device 120. For instance, in some embodiments, the second segment 120b may be configured to be capable of disengaging from the drogue 114 wherein no portion of the shear bolt 210c (or other fuse device 120) may remain operably engaged with the drogue after the disengagement of the drogue 114 from the second end 113 of the elongate hose 112. For example, the second portion 120b of the shear bolt 210c may comprise a head of the shear bolt 210c that may be released upon the disengagement of the drogue 114 from the second end 113 of the elongate hose 112. In addition, according to other embodiments, the fuse device 120 may comprise an adhesive material, magnetic device, or other material and/or mechanism suitable for selectively and directly engaging the second end 113 of the elongate hose 112 with the drogue 114 such that the drogue 114 may be disengaged from the second end 113 of the elongate hose 112 in response to the separating force wherein no portion of the fuse device 120 may remain operably engaged with the disengaged drogue 114.

FIG. 5 shows an in-flight refueling system according to one embodiment of the present invention wherein the fuse device 120 (which is disposed between a second end 113 of the elongate hose 112 and the drogue 114 carried by the tanker aircraft 110 as part of a probe and drogue in-flight refueling system) has been separated into a first segment 120a operably engaged with the second end 113 of the elongate hose 112 and a second segment 120b operably engaged with a drogue 114. As shown in FIG. 5 the drogue 114 (and the second segment 120b of the fuse device 120 operably engaged therewith) has been separated from the in-flight refueling system due to, for instance, an emergency wherein a force at least as great as the separating force has been applied to the fuse device 120. Thus, the drogue 114 may be carried by, for instance, the refueling probe 132 of the second aircraft 130. While this arrangement is not optimal (as the drogue 114 may block the view of an operator of the second aircraft 130 as well as introduce aerodynamic disturbances to the flight characteristics of the second aircraft 130), the second aircraft may still, however, land safely with the drogue 114 carried thereby without the danger of a portion of the elongate hose 112 being attached to the drogue 114 and possibly striking the second aircraft 130 or being drawn into a jet intake of the second aircraft 130. In addition, the first segment 120a of the fuse device 120 is shown operably engaged with the second end 113 of the elongate hose 112. Upon the separation of the fuse device 120, an operator of the in-flight refueling system carried by the tanker aircraft 110 may prevent a flow of fuel through the elongate hose, by, for instance, actuating a fuel shut-off valve 501 that may be disposed within a fuselage of the tanker aircraft 110 so as to prevent the passage of fuel through the elongate hose 112 and out into the open air via the separated first segment 120a of the fuse device 120. In addition, the in-flight refueling system carried by the tanker aircraft 110 may further comprise a guillotine device configured to jettison the elongate hose 112 (and the first segment 120a of the fuse device 120 attached thereto) if, for instance, the in-flight refueling system is incapable of safely retracting the elongate hose 112 into a fuselage of the tanker aircraft 110.

Referring again to FIG. 1, the embodiments of the present invention also provide a method for facilitating the emergency separation of a drogue 114 from an elongate hose 112 wherein the drogue 114 and elongate hose 112 are operably engaged and in fluid communication via a fuse device 120 disposed therebetween as part of an in-flight refueling system. The method may comprise the steps of exerting a separating force on the drogue 114 (such as by inserting a refueling probe 132 carried by a second aircraft 130 into the drogue 114 and subsequently decelerating the second aircraft 130 with respect to the moving drogue 114; and disengaging the drogue 114 from elongate hose 112 at the fuse device 120 in response to a separating force exerted on the elongate hose 112 and the drogue 114, such that the first portion of the elongate hose may be separable from the drogue 114 in response to the separating force. In other embodiments of the method of the present invention, the disengaging step may further comprise the step of separating the fuse device 120 into a first segment 120a operably engaged with the elongate hose 112 and a second segment 120b operably engaged with the drogue 114 in response to the separating force exerted on the drogue 114. According to other embodiments, the method of the present invention may further comprise blocking a flow of fuel through the elongate hose 112 so as to prevent the flow of fuel from exiting the elongate hose 112 via the first segment 120a. This blocking step may be accomplished by, for instance, actuating a fuel control valve 501 carried by the tanker aircraft 110 so as to shut off the flow of fuel through the in-flight refueling system. Furthermore, according to other embodiments, the separating step (described in more detail above) may further comprise separating the fuse device 120 using a separating force that is less than a breakage force required to damage the elongate hose 112. Thus, the fuse device 120 may fail prior to the breakage of the elongate hose 112 so as to prevent the unpredictable and possibly violent breakage of the elongate hose 112 and/or other components of the in-flight refueling system carried by the tanker aircraft 110.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An in-flight refueling system comprising:
    a tanker aircraft;
    an elongate hose having a first end carried by the tanker aircraft and a drogue operably engaged with and in fluid communication with an opposing second end thereof;
    a fuse device operably engaged between the second end of the elongate hose and the drogue so as to allow fluid communication therebetween, the fuse device being configured to disengage the drogue from the elongate hose in response to a separating force experienced thereby, such that the elongate hose is separable from the drogue in response to the separating force; and
    a valve device disposed between the tanker aircraft and the first end of the elongate hose, the valve device prevents a fluid flow though the elongate hose when the drogue is disengaged from the elongate hose.

2. An in-flight refueling system according to claim 1, wherein the fuse device is further configured to be separable into a first segment operably engaged with a first portion of the elongate hose and a second segment operably engaged with the drogue in response to a separating force experienced thereby, such that the first portion of the elongate hose is separable from the drogue in response to the separating force.

3. An in-flight refueling system according to claim 1, wherein the fuse device is operably engaged between the second end of the elongate hose and the drogue such that the fuse device is further configured to be separable into a first segment operably engaged with the second end of the elongate hose and a second segment operably engaged with the drogue in response to a separating force experienced thereby, such that the drogue is separable from the second end of the elongate hose in response to the separating force.

4. An in-flight refueling system according to claim 1, wherein the fuse device is further configured such that the separating force is less than a breakage force required to damage the elongate hose.

5. An in-flight refueling system according to claim 1, wherein the fuse device is selected from the group consisting of:
    at least one shear bolt;
    a cylindrical conduit; and
    combinations thereof.

6. An in-flight refueling system according to claim 1, wherein the fuse device further comprises:
    a first threaded portion configured to be capable of operably engaging a first threaded surface disposed on the second end of the elongate hose; and
    a second threaded portion configured to be capable of operably engaging a second threaded surface disposed on the drogue.

7. An in-flight refueling system adapted to be carried by a tanker aircraft, comprising:
    an elongate hose having a first end carried by the tanker aircraft and a drogue operably engaged with and in fluid communication with an opposing second end thereof;
    a fuse device operably engaged between the second end of the elongate hose and the drogue so as to allow fluid communication therebetween, the fuse device being configured to disengage the drogue from the elongate hose in response to a separating force experienced thereby, such that the elongate hose is separable from the drogue in response to the separating force; and
    a valve device disposed between the tanker aircraft and the first end of the elongate hose, the valve device prevents a fluid flow though the elongate hose when the drogue is disengaged from the elongate hose.

8. An in-flight refueling system according to claim 7, wherein the fuse device is further configured to be separable into a first segment operably engaged with a first portion of the elongate hose and a second segment operably engaged with the drogue in response to a separating force experienced thereby, such that the first portion of the elongate hose is separable from the drogue in response to the separating force.

9. An in-flight refueling system according to claim 7, wherein the fuse device is operably engaged between the second end of the elongate hose and the drogue such that the fuse device is further configured to be separable into a first segment operably engaged with the second end of the elongate hose and a second segment operably engaged with the drogue in response to a separating force experienced thereby, such that the drogue is separable from the second end of the elongate hose in response to the separating force.

10. An in-flight refueling system according to claim 7, wherein the fuse device is further configured such that the separating force is less than a breakage force required to damage the elongate hose.

11. An in-flight refueling system according to claim 7, wherein the fuse device is selected from the group consisting of:
    at least one shear bolt;
    a cylindrical conduit; and
    combinations thereof.

12. An in-flight refueling system according to claim 7, wherein the fuse device further comprises:
    a first threaded portion configured to be capable of operably engaging a first threaded surface disposed on the second end of the elongate hose; and
    a second threaded portion configured to be capable of operably engaging a second threaded surface disposed on the drogue.

* * * * *